(12) United States Patent
Kiefer et al.

(10) Patent No.: US 6,238,690 B1
(45) Date of Patent: *May 29, 2001

(54) FOOD PRODUCTS CONTAINING SEAMLESS CAPSULES AND METHODS OF MAKING THE SAME

(75) Inventors: Jesse John Kiefer, Belvidere; Blake Henderson Glenn, Madison, both of NJ (US)

(73) Assignee: Warner-Lambert Company, Morris Plains, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,448

(22) Filed: Mar. 28, 1997

Related U.S. Application Data

(60) Continuation-in-part of application No. 08/686,649, filed on Jul. 24, 1996, which is a division of application No. 08/412,672, filed on Mar. 29, 1995, now Pat. No. 5,595,757.

(51) Int. Cl.[7] .................................................. A61K 47/00
(52) U.S. Cl. ..................... 424/439; 424/489; 424/463; 424/442; 424/48
(58) Field of Search ..................... 424/456, 490, 424/489, 90, 402.2, 402.21

(56) References Cited

U.S. PATENT DOCUMENTS

| | | |
|---|---|---|
| 2,857,281 | 10/1958 | Schultz et al. ........................ 99/140 |
| 3,971,852 | 7/1976 | Brenner et al. ...................... 426/103 |
| 4,251,195 | 2/1981 | Suzuki et al. ........................... 425/6 |
| 4,279,632 | 7/1981 | Frosch et al. ......................... 65/21.4 |
| 4,422,985 | 12/1983 | Morishita et al. .................... 264/4.4 |
| 4,695,466 | 9/1987 | Morishita et al. .................... 424/456 |
| 4,888,140 | 12/1989 | Schlameus et al. .................. 264/4.3 |
| 5,009,900 | 4/1991 | Levine et al. .......................... 426/96 |
| 5,095,054 | 3/1992 | Lay et al. . |
| 5,300,305 | 4/1994 | Stapler et al. ......................... 424/90 |
| 5,370,864 | 12/1994 | Peterson et al. ....................... 424/49 |
| 5,620,707 | 4/1997 | Sanker et al. ........................ 424/489 |

FOREIGN PATENT DOCUMENTS

| | | |
|---|---|---|
| 563807 | 7/1975 | (CH) . |
| 675370 | 9/1990 | (CH) . |
| 0339958 | 11/1989 | (EP) . |
| 0513563 | 11/1992 | (EP) . |
| 0525731 | 2/1993 | (EP) . |

*Primary Examiner*—Thurman K. Page
*Assistant Examiner*—Rachel M. Bennett
(74) *Attorney, Agent, or Firm*—Linda A. Vag

(57) ABSTRACT

Consumable products including seamless capsules having an outer shell made of a carbohydrate material in a glassy state and an inner core.

23 Claims, 2 Drawing Sheets

FOOD PRODUCTS CONTAINING SEAMLESS CAPSULES AND METHODS OF MAKING THE SAME

RELATED APPLICATION

This is continuation-in-part application of U.S. Ser. No. 08/686,649, filed Jul. 24, 1996 which is a divisional of U.S. Ser. No. 08/412,672 filed Mar. 29, 1995, now U.S. Pat. No. 5,595,757 issued Jan. 21, 1997.

BACKGROUND OF THE INVENTION

1. Field of the Invention

The present invention is related to a seamless capsule comprising a shell material encapsulating a center-filled core material, wherein the shell material is formed of a carbohydrate in glassy state, to methods and apparatus for making the seamless capsule and to food products and topically applied products employing the same.

2. Description of the Prior Art

Traditionally, seamless capsules formed of a shell material encapsulating a core material have been made by using as the shell material film-forming materials such as gelatin and gums. These shell materials present two disadvantages. First, they are formed from an aqueous solution. Consequently, when the capsules are formed, large amounts of water must be removed, requiring great amounts of energy and long drying times. Second, these shell materials dissolve slowly when the capsules are being consumed, thereby leaving a distasteful plastic film-like residue in the mouth.

Seamless capsules are usually made by simultaneously extruding the shell material and the core material through concentrically aligned nozzles such that the extruded shell material and the extruded core material exit the nozzles as a coaxial jet with the shell material surrounding the core material into a stream of cooled carrier fluid that is flowing downward. While descending in the cooled carrier fluid, the coaxial jet breaks into droplets with the shell material encapsulating the core material. The droplets then solidify in the cooled carrier fluid to form seamless capsules. Such methods are disclosed, for example, in U.S. Pat. Nos. 4,251,195 and 4,695,466. However, when the shell material is a material that solidifies quickly, this prior art method is disadvantageous in that the shell material in the coaxial jet may solidify prior to encapsulation As a result, seamless capsules could not be formed, and any capsules that were formed were not spherical and did not have uniform size and shape.

An attempt to overcome this problem was proposed in U.S. Pat. No. 4,422,985, which describes a method that modifies the prior art method by introducing a coaxial triple jet consisting of a heated circulating liquid surrounding the shell material which in turn surrounds the core material into the cooled carrier liquid to allow encapsulation to take place. In this method, since capsule formation must still take place in the cooled carrier liquid, if any solidification of the shell material occurs prior to entering the cooled carrier liquid, encapsulation will not occur.

Other methods used for making capsules typically involve using a screw extruder to extrude an emulsion containing the shell matrix and the material to be encapsulated. However, in such a process, it is difficult to make a capsule formed of a shell material encapsulating a center-filled core material. Instead, the encapsulated material is often in the form of globules that are distributed within the matrix.

U.S. Pat. No. 2,857,281 describes a process for making a solid flavoring composition in the form of globular particles by extruding an emulsion containing a sugar base and flavor oil into droplets.

U.S. Pat No. 3,971,852 describes a process for encapsulating oil in a cellular matrix that is formed of polyhydroxy and polysaccharide compounds. The oil is in an emulsified state with the cellular matrix, and the resulting emulsion is spray dried as droplets of the emulsion.

U.S. Pat. No. 5,009,900 discloses a process for encapsulating volatile and/or labile components with extruded glassy matrices, wherein the encapsulated material is distributed in the glassy matrices.

European Patent Application No. 0339958 discloses an antifoaming composition containing an outer shell of a meltable sugar in its crystalline state with an organopolysiloxane antifoaming composition imbedded therein. This composition is formed by melting a sugar base and dispersing the organopolysiloxane antifoaming composition in the sugar melt as the discontinuous phase. The melt is then solidified, thereby imbedding and entrapping the antifoaming composition, which is dispersed in the melt.

U.S. Pat. No. 5,300,305 relates to microcapsule that provide long lasting breath protection.

An effective means of forming seamless capsules comprising a shell material encapsulating a core material in accordance with the present invention enable the production of a wide variety of products for consumption or application to the human body.

SUMMARY OF THE INVENTION

The present invention is generally directed to end use products for consumption and application to the human body in the form of or including seamless capsules comprising a shell material made of a glassy carbohydrate encapsulating a core material which are produced by a method comprising the steps of:

providing a concentrically aligned multiple nozzle system having at least an outer nozzle and an inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a flow of a heated carrier fluid, thereby allowing the shell material to encapsulate the core material to form capsules in the heated carrier fluid; and introducing the capsules into a flow of a cooled carrier fluid, thereby allowing the capsules to solidify.

The seamless capsules can be used, for example, in the production of food products, beverages, topical compositions and the like.

BRIEF DESCRIPTION OF THE DRAWINGS

The following drawings are illustrative of embodiments of the invention and are not intended to limit the invention as encompassed by the claims forming part of the Application.

DETAILED DESCRIPTION OF THE INVENTION

Figure 1:
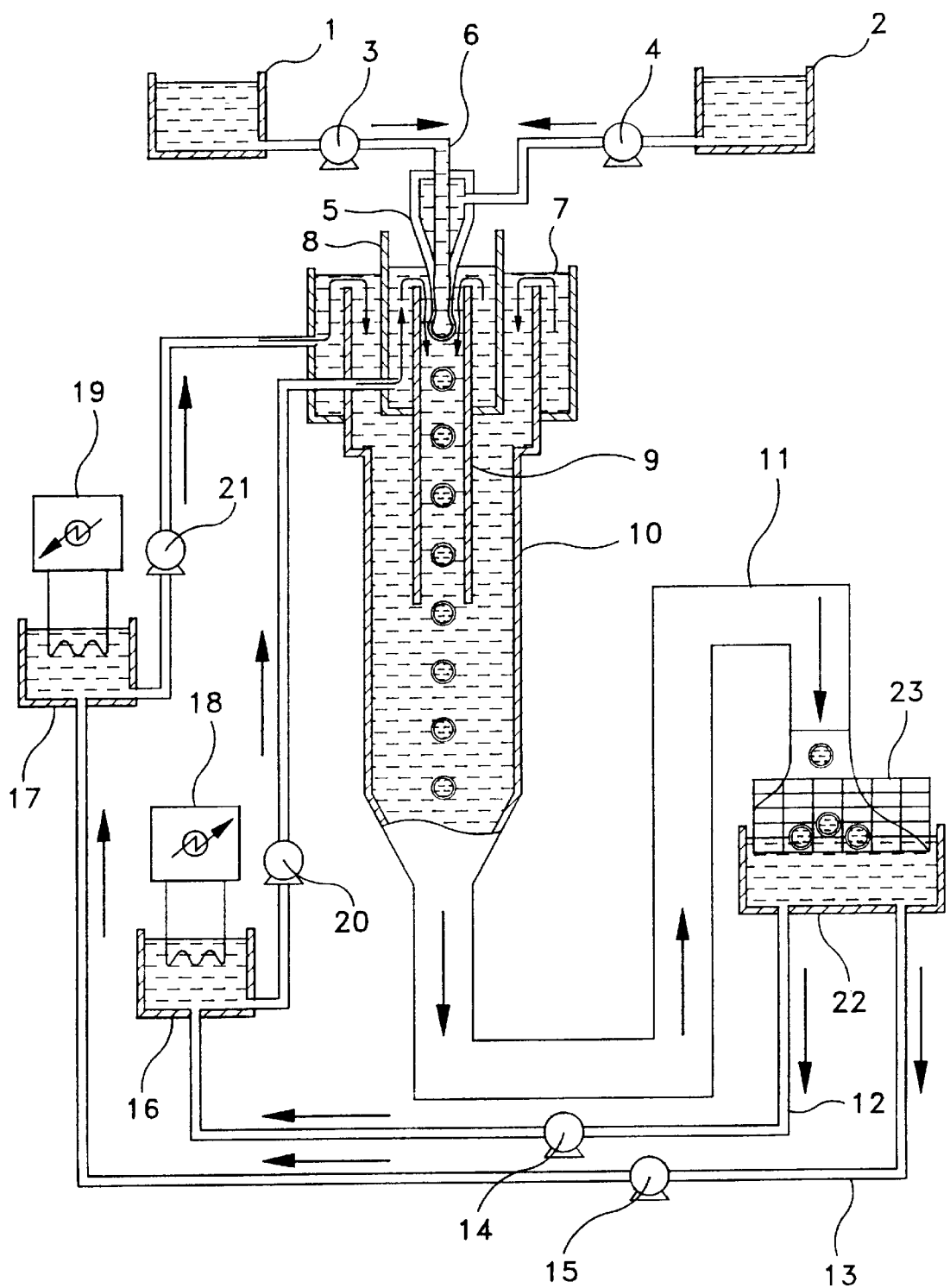
FIG. 1 illustrates a schematic sectional side view of an apparatus for making seamless capsules according to one embodiment of the present invention.

The present inventors have discovered that seamless capsules can be formed by employing carbohydrates in glassy state as the shell materials. Because carbohydrates in glassy state are formed through solidification, capsule drying is not required. In addition, the carbohydrate shell materials dissolve rapidly and do not leave distasteful residues in the mouth Because carbohydrates solidify rapidly in a cooled medium, in the prior art method discussed above, prior to encapsulating the core material, the carbohydrate shell material already solidifies in the cooled carrier fluid. Unless otherwise indicated the term "fluid" is meant to encompass a liquid or air. As a result of this rapid cooling, seamless capsules could not be formed, and any capsules that were formed were not spherical and did not have uniform size and shape.

The present inventors have discovered a method and an apparatus for making seamless capsules that overcome the drawbacks in the prior art and are capable of forming seamless capsules that are uniform in size and shape even when carbohydrates are used as the shell materials. In addition, this method and apparatus can make seamless capsules formed of a shell material encapsulating a singe center-filled core material, i.e., the core material is not distributed or dispersed within the shell material matrix.

The end use compositions in which the seamless capsules of the present invention are employed include consumable products and products applied to the human body.

The consumable products include foodstuffs, beverages, medicament compositions, chewing gums, confectionery, and dentifrice compositions. Preferably, the consumable product does not adversely affect the integrity of the seamless capsule. For example, some consumable products which have a high water activity could adversely affect the carbohydrate shell such as by rupturing the shell. For such applications damage to the shell can be avoided by adding the capsule to the consumable product at about the time of consumption. Damage may also be avoided by adding to or coating the seamless capsule with a water barrier material such as a wax, fat, water impermeable polymer and the like, or combinations thereof. Such coating techniques as would be employed herein are well known to those skilled in the art and are described in, for example, "Sugar Confectionery Manufacture", W. B. Jackson, ed., 2nd Edition, Blackie Academic and Professional 1995.

Foodstuffs include ice cream, jellies, whipped toppings, and the like.

Beverages include both non-alcoholic beverages such as carbonated sodas, tea, juices and the like as well as alcoholic beverages.

Medicament compositions include, for example, antiseptics, analgesics, antibiotics, antifungals, cough mixtures, antacids, digestive aids, decongestants and the like. Such compositions may be administered as tablets, lozenges, nose sprays, liquid formulations, capsules, geltabs, and the like.

Chewing gums include those having a soft or hard shell both containing sugar and sugar free.

Confectionery include, but are not limited to hard and soft candy compositions, chocolates, candy bars and the like.

Dentifrice compositions include, for example, toothpastes, antiplaque washes, mouthwashes, gargles, and the like.

Products produced in accordance with the present invention which are applied to the human body include toiletries, such as shaving lotions, soaps, creams and foams, colognes, deodorants, antiperspirants, bath oils, shampoos, hair treating compositions, conditioners, sunburn lotions, talcum powders, face creams, hand creams, and the like.

FIG. 1 illustrates an example of an apparatus that can be used to make a seamless capsule according to the present invention. The apparatus comprises a multiple nozzle system having an outer nozzle 5 and an inner nozzle 6, which are concentrically aligned. The inner nozzle 6 is connected to a tank 1, which supplies the core material to the inner nozzle 6 through a gear pump 3. The outer nozzle 5 is connected to a tank 2, which supplies the shell material to the outer nozzle 5 through a gear pump 4. A duct 9 is located beneath the multiple nozzle system. The upper part of the duct 9 is surrounded by a heating cylinder 8 in a concentric alignment. The heating cylinder 8 is connected to a tank 16, which is provided with a heater 18 for heating a carrier fluid that is fed through a feed pump 20 to the heating cylinder 8. The heating cylinder 8 has an overflow over the duct 9, thereby allowing the heated carrier fluid to flow from the heating cylinder 8 into the duct 9.

The lower end of the duct 9 extends into a duct 10. The upper part of the duct 10 is surrounded by a cooling cylinder 7 in a concentric alignment. The cooling cylinder 7 is connected to a tank 17, which is provided with a cooler 19 for cooling a carrier fluid. The cooled carrier fluid is fed through a feed pump 21 to the cooling cylinder 7. The cooling cylinder 7 has an overflow over the duct 10, thereby allowing the cooled carrier fluid to flow from the cooling cylinder 7 to the duct 10.

The lower end of the duct 10 forms a funnel-shape portion, which is connected to a recovery pipe 11. The recovery pipe 11 extends towards a circulating fluid tank 22 and terminates at a small distance from the top of the circulating fluid tank 22. Arranged on the circulating fluid tank 22 is a net-like separator 23 for separating capsules from the carrier fluid. The tank 22 is connected through a pipe 12, which passes through a recycle pump 14, to tank 16 for supplying the carrier fluid to be heated in tank 16. The tank 22 is also connected to a pipe 13, which passes through a recycle pump 15, for supplying the carrier fluid to be cooled in tank 17.

Figure 2:
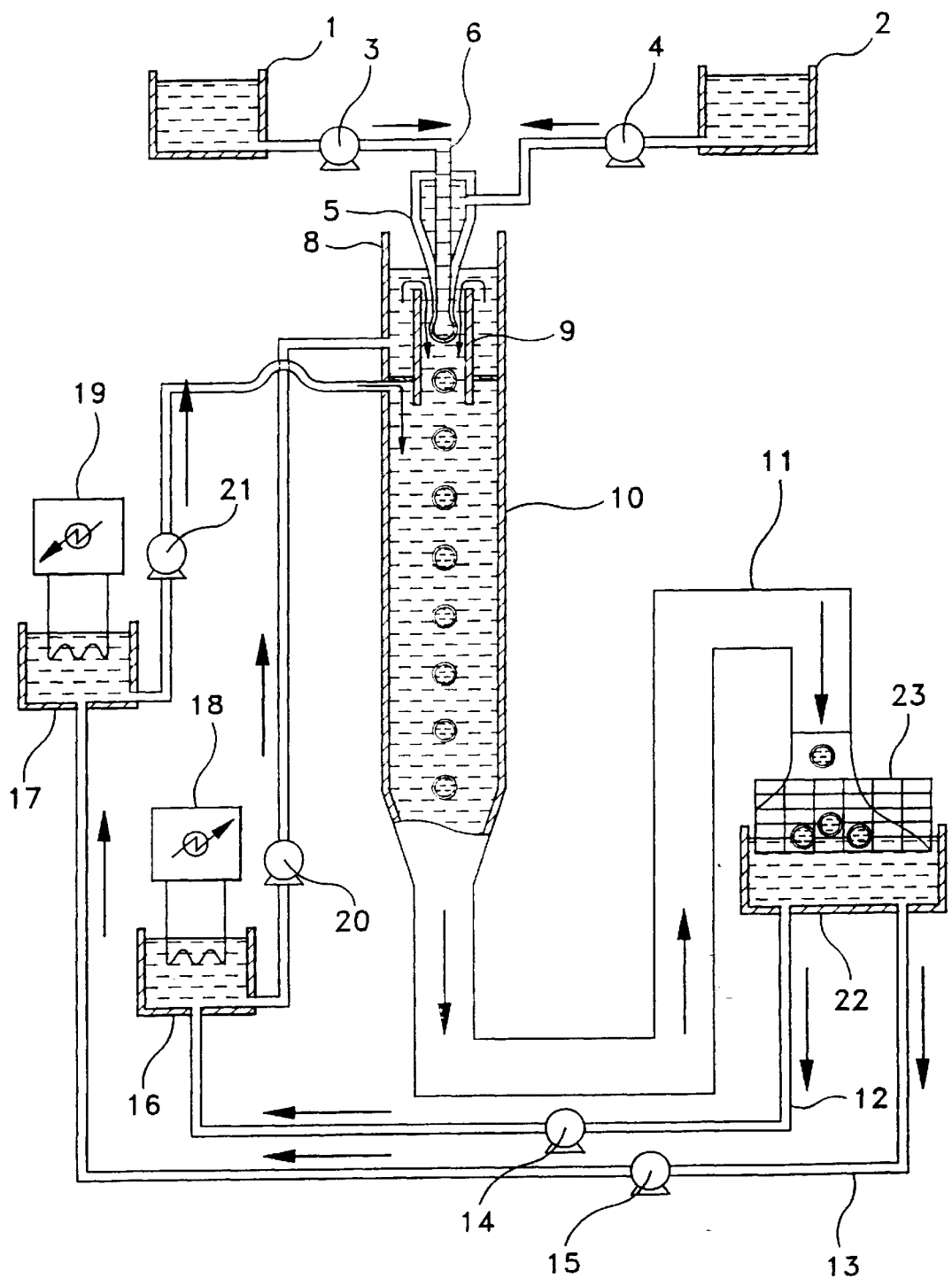
FIG. 2 illustrates a schematic sectional side view of an apparatus for making seamless capsules according to another embodiment of the present invention.

FIG. 2 illustrates an alternative embodiment of an apparatus that can be used to make the seamless capsules of this invention. The apparatus in this embodiment is similar to that depicted in FIG. 1, except that the cooled carrier fluid is pumped from the tank 17 directly into a duct 10 without using a cooling cylinder provided with an overflow into duct 10. The heated carrier fluid need not be combined with a separate source of a cooled carrier fluid as described in the embodiments shown in FIGS. 1 and 2. Alternatively, a heat exchange system can be placed in proximity to the duct 10 to cool the heated carrier fluid as it passes from the duct 9 into the duct 10. Details of apparatus and methods for forming seamless capsules in this manner are disclosed in U.S. patent application Ser. No. 08/828,457 bearing Attorney Docket No. PD-5160 P-2 filed concurrently herewith.

The process of making the seamless capsules will now be described in detail. The shell material is supplied from tank 2 into the outer nozzle 5 and the core material is supplied from the tank 1 into inner nozzle 6. The core material and the shell material are then simultaneously extruded to form a coaxial jet with the shell material surrounding the core material. The carrier fluid in tank 16 is heated to a temperature that is close to or higher than the temperature of the shell material and is supplied to duct 9. Typically, the temperature of the heated carrier fluid is from about 90° to 160° C. The coaxial jet is introduced to the duct 9 containing the heated carrier fluid flowing downward. Because the heated carrier fluid is at a temperature that is close to or higher than the temperature of the shell material in the coaxial jet, it prevents the shell material from solidifying, thereby allowing the shell material to encapsulate the core material to form capsules.

The carrier fluid in tank 17 is cooled to a low enough temperature that can allow the capsules to solidify, particularly when combined with the heated carrier fluid. Preferably, the carrier fluid is cooled to a temperature of from about −20° to 30° C. The cooled carrier fluid is supplied from tank 17 to duct 10. The capsules from duct 9 are then carried by the heated carrier fluid into duct 10 containing the cooled carrier fluid that is flowing downward. The final temperature of the combined streams is low enough so that the capsules are then cooled sufficiently to allow them to solidify in duct 10 to form the seamless capsules. The thus-formed seamless capsules are then transported through pipe 11 toward separator 23 located in tank 22. The separator 23 separates the seamless capsules from the carrier fluid to collect the seamless capsules. The separated carrier fluid flows into tank 22 and is then recycled to tanks 16 and 17 through pipes 12 and 13, respectively.

In an alternative embodiment, the coaxial jet simultaneously extruded from the multiple nozzles is introduced into air instead of a flow of the heated carrier fluid. As the coaxial jet descends through air for a sufficient distance, it breaks down into droplets, thereby allowing the shell material to encapsulate the core material to form capsules. Typically, the distance that the coaxial jet travels through air is from about 3 to 15 cm. The capsules then descend into a flow of cooled carrier fluid to allow the capsules to solidify. The temperature of the air should be higher than that of the cooled carrier fluid and should be maintained within a range in which the shell material does not solidify within the travelled distance. The air temperature may be maintained at ambient temperature, i.e., from about 25° to 35° C., or in another embodiment, the air can be heated above ambient, at a preselected set point, for example, by the use of a tubular heater which maintains the air within at the preselected temperature. The use of heated air is a preferred embodiment in that it has been found that the use of heated air provides a more spherical capsule.

Any fluid that does not dissolve the shell material and can be heated and cooled to the appropriate temperatures without undergoing phase change can be used as the carrier fluid in the present invention. Examples of suitable carrier fluids include medium chain triglyceride (MCT) oil, corn oil, cottonseed oil, canola (rapeseed) oil, sunflower oil, silicone oils, mineral oils and the like.

Preferably, the shell material and the core material are simultaneously extruded by setting the fluid volumetric flux of the shell material through the outer nozzle equal to the fluid volumetric flux of the core material through the inner nozzle. The fluid volumetric flux of a material flowing from a nozzle orifice is defined as the ratio of the volumetric flow rate of the material through the nozzle to the nozzle orifice area. As described by co-pending application Ser. No. 08/325,722, filed Oct. 7, 1994, the disclosure of which is hereby incorporated herein by reference, by setting the fluid volumetric flux of the shell material equal to that of the core material through the concentrically aligned nozzles, the mass ratio of the core material to the shell material in the capsule can be controlled by merely varying the size of the orifice areas of the nozzles.

The concentrically aligned multiple nozzle system that can be used in the present invention can have more than two concentrically aligned inner and outer nozzles. There can be one or more concentrically aligned intermediate nozzles positioned between the inner and outer nozzles, from which one or more intermediate shell materials can be extruded. In such an embodiment, the shell material extruded from the outer nozzle encapsulates the intermediate shell material extruded from the intermediate nozzle, which in turn encapsulates the core material from the inner nozzle. In a preferred embodiment of this invention, the fluid volumetric flux of the intermediate shell material through the intermediate nozzle will be set to be equal to the fluid volumetric flux of shell material through the outer nozzle and the fluid volumetric flux of the core material through the inner nozzle.

Examples of suitable carbohydrates that can be used as the shell material in the present invention include sucrose, glucose, fructose, isomalt, hydrogenated starch hydrolysate, maltitol, lactitol, xylitol, sorbitol, erythritol, mannitol, and the like, and mixtures thereof Typically, the carbohydrate is fed into the outer nozzle as the shell material in the form of a melt. When the carbohydrate solidifies in the cooled carrier liquid, it turns into a glassy state, i.e., amorphous state. When the carbohydrate is in a glassy state, it exhibits an enhanced ability to protect the center-filled core material from vaporization and deterioration.

Suitable core materials are those which can be incorporated into the various products for consumption and topical application previously described. Core materials are typically in liquid form or meltable solid materials. Examples of suitable core materials include MCT oils, (e.g., such as coconut oil,), peppermint oil, cinnamon oil, fennel oil, clove oil, wheat-canola (rapeseed) oil, sunflower oil soybean oil, cottonseed oil, and the like), silicone oils, mineral oils, fruit flavors, vitamins, pharmaceutical solutions, natural and artificial sweeteners, menthol, and the like.

Any material that is liquid at the operating temperature and does not dissolve the core or shell materials and further solidifies during the cooling process may be used as an intermediate shell material. Examples of suitable intermediate shell materials include waxes (e.g., paraffin wax, microcrystaline wax, polyethylene wax, carnauba wax, candellila wax and the like) and fats (e.g., hydrogenated fats such as those known to persons of skill in the art).

The following examples are illustrative of embodiments of the invention and are not intended to limit the invention as encompassed by the claims forming part of the Application.

EXAMPLE 1

Seamless capsules were prepared by using a concentrically aligned multiple nozzle system having an inner nozzle and an outer nozzle. The inner nozzle had an inside diameter of 0.20 cm, and outside diameter of 0.26 cm, and an orifice area of 0.0314 cm$^2$. The outer nozzle had an inside diameter of 0.39 cm and an annular orifice area of 0.0664 cm$^2$. A mixture of 90 wt. % isomalt and 10 wt. % xylitol was melted at a temperature of 155° C. and maintained in a tank at 148° C. This mixture had an actual viscosity of 628 cps at 140° C. Generally, the methods of the present invention would involve the use of shell materials having an actual viscosity of less than about 1,000 cps at the operating temperature. The resultant mixture had a density of 1 g/ml. The mixture was then fed to the outer nozzle as the shell material at a temperature of 145° C. and a volumetric flow rate of 2.37 ml/min. A mixture of 10 wt % cherry flavor and 90 wt. % cotton seed oil having a density of 0.96 g/ml was supplied to the inner nozzle as the core material at ambient temperature and a volumetric flow rate of 5.01 ml/min. The shell material and the core material were then simultaneously extruded from the outer and inner nozzles, respectively, at the same fluid volumetric flux of 75.5 ml/min. cm$^2$ into air, which was maintained at 200° C. The coaxial jet descended through air for 10 cm and broke down into droplets to allow encapsulation to take place. The capsules then descended into coconut oil cooled to a temperature of 20° C. and flowing downward at a rate of 1,000 ml/min. The resultant capsules collected had a diameter of about 4 mm and contained 68.78 wt. % of the shell material in a glassy state and 31.22 wt. % of the core material.

EXAMPLES 2–6

Five seamless flavor bead compositions each having an oil based center can be prepared in accordance with Example 1. Each of the compositions has an outer shell comprising 70% by weight and an inner core comprised of 30% by weight based on the total weight of the flavor bead composition.

The components comprising each of the flavor bead compositions are shown in Table 1.

TABLE 1

|  | 2 | 3 | 4 | 5 | 6 |
|---|---|---|---|---|---|
| Shell (70%) |  |  |  |  |  |
| Isomalt | 62.8153 | 62.8153 | 62.8153 | 62.8153 | 62.8153 |
| Xylitol | 6.9800 | 6.9800 | 6.9800 | 6.9800 | 6.9800 |
| Acesulfame-K | 0.1540 | 0.1540 | 0.1540 | 0.1540 | 0.1540 |
| Ethyl Vanillin | 0.0007 | 0.0007 | 0.0007 | 0.0007 | 0.0007 |
| FD&C Blue #2 | 0.0500 | 0.0000 | 0.0000 | 0.0000 | 0.0000 |
| FD&C Red #40 | 0.0000 | 0.0000 | 0.0000 | 0.2100 | 0.2100 |
| Core (30%) |  |  |  |  |  |
| Wesson Oil #77 | 25.4100 | 25.4100 | 25.4100 | 25.4100 | 25.4100 |
| Star Anise Oil | 0.0900 | 0.0900 | 0.0900 | 0.0900 | 0.0900 |
| Peppermint Oil | 4.5000 | 0.0000 | 0.0000 | 0.0000 | 0.0000 |
| Tropical Punch | 0.0000 | 6.0000 | 0.0000 | 0.0000 | 0.0000 |
| Grapefruit Oil | 0.0000 | 0.0000 | 6.0000 | 0.0000 | 0.0000 |
| Cherry Oil | 0.0000 | 0.0000 | 0.0000 | 6.0000 | 0.0000 |
| Cinnamon Oil | 0.0000 | 0.0000 | 0.0000 | 0.0000 | 6.0000 |
| Total | 100.0000 | 100.0000 | 100.0000 | 100.0000 | 100.0000 |

Each of the samples shown in Table 1 exhibited uniform size and shape seamless capsules which rapidly dissolve in the mouth and do not leave an undesirable aftertaste, or residue.

EXAMPLES 7–8

Two seamless flavor bead compositions each having an oil based center can be prepared in accordance with Example 1. Each of the compositions has an outer shell comprising 20% by weight and an inner core comprised of 80% by weight based on the total weight of the flavor bead composition.

The components comprising each of the flavor bead compositions are shown in Table 2.

TABLE 2

|  | 7 | 8 |
|---|---|---|
| Shell (20%) |  |  |
| Isomalt | 17.9472 | 17.9472 |
| Xylitol | 1.9943 | 1.9943 |
| Acesulfame-K | 0.0440 | 0.0440 |
| Ethyl Vanillin | 0.0002 | 0.0002 |
| FD&C Blue #2 | 0.0143 | 0.0143 |
| Core (30%) |  |  |
| Wesson Oil #77 | 77.7050 | 55.0000 |
| Star Anise Oil | 0.0450 | 0.0000 |
| Peppermint Oil | 2.2500 | 25.0000 |
| Total | 100.0000 | 100.0000 |

EXAMPLES 9–11

A seamless flavor bead composition (Example 9) having an oil based center was prepared in a manner similar to Example 1 with process parameters shown in Table 3. Two additional seamless flavor bead compositions (Examples 10 and 11) are prepared in a manner similar to Example 9. Each of the compositions has an outer shell and an inner core as shown in Table 4.

TABLE 3

| Process Parameters | 9 | 10 | 11 |
|---|---|---|---|
| Inner Nozzle I.D. (cm) | 0.2000 | 0.2000 | 0.2000 |
| Inner Nozzle O.D. (cm) | 0.2600 | 0.2600 | 0.2600 |
| Orifice Area (cm2) | 0.0314 | 0.0314 | 0.0314 |
| Outer Nozzle I.D. (cm) | 0.3900 | 0.2800 | 0.2800 |
| Annulus Area (cm2) | 0.0664 | 0.0085 | 0.0085 |
| Shell Temp (C.) | 145.000 | 145.0000 | 145.0000 |
| Core Temp. (C.) | 25.0000 | 25.0000 | 25.0000 |
| Air Column Temp (C.) | 150.0000 | 150.0000 | 150.0000 |
| Carrier Fluid Temp (C.) | 20.0000 | 20.0000 | 20.0000 |
| Shell Flow Rate (mL/min) | 5.0100 | 2.0000 | 2.0000 |
| Core Flow Rate (mL/min) | 2.3700 | 7.4100 | 7.4100 |
| Carrier Flow Rate (mL/min) | 10000.0000 | 10000.0000 | 10000.0000 |
| Capsule Size (mm) | 4.5000 | 4.5000 | 4.5000 |

TABLE 4

|  | 9 | 10 | 11 |
|---|---|---|---|
| Shell |  |  |  |
| Isomalt | 62.8153 | 17.9472 | 17.9472 |
| Xylitol | 6.9800 | 1.9943 | 1.9943 |
| Acesulfame-K | 0.1540 | 0.0440 | 0.0440 |
| Ethyl Vanillin | 0.0007 | 0.0002 | 0.0002 |
| Colorant* | 0.0500 | 0.0143 | 0.0143 |
| Wt % Shell | 70.0000 | 20.0000 | 20.0000 |
| Core |  |  |  |
| Wesson Oil #77 | 25.41000 | 77.7050 | 55.0000 |
| Star Anise Oil | 0.0900 | 0.0450 | 0.0000 |
| Flavor** | 4.5000 | 2.2500 | 25.0000 |
| Wt % Core | 30.0000 | 80.0000 | 80.0000 |
| Total | 100.0000 | 100.0000 | 100.0000 |

The flavor bead composition of Example 9 as shown in Table 4 exhibited uniform size and shape seamless capsules which rapidly dissolve into the mouth and do not leave an undesirable aftertaste, or residue.

EXAMPLES 12–14

Three flavor bead compositions each having the composition of Example 11 as shown in Table 3 can be prepared by the method of Example 1 except that the outer shell and core materials are extruded into a heated liquid carrier material (i.e. MCT oil) under the key process conditions shown in Table 5.

TABLE 5

| Process Parameters | 12 | 13 | 14 |
|---|---|---|---|
| Inner Nozzle I.D. (cm) | 0.2000 | 0.2000 | 0.2000 |
| Inner Nozzle O.D. (cm) | 0.2600 | 0.2600 | 0.2600 |
| Orifice Area (cm2) | 0.0314 | 0.0314 | 0.0314 |
| Outer Nozzle I.D. (cm) | 0.2800 | 0.2800 | 0.2800 |
| Annulus Area (cm2) | 0.0085 | 0.0085 | 0.0085 |
| Shell Temp (C.) | 145.0000 | 145.0000 | 145.0000 |
| Core Temp (C.) | 25.0000 | 25.0000 | 25.0000 |
| Heated Carrier Temp (C.) | 120.0000 | 120.0000 | 120.0000 |
| Cold Carrier Temp (C.) | 0.0000 | 0.0000 | 0.0000 |
| Shell Flow Rate (mL/min) | 2.0000 | 2.0000 | 2.0000 |
| Core Flow Rate (mL/min) | 7.4100 | 7.4100 | 7.4100 |
| Carrier Flow Rate (mL/min) | 6500.0000 | 2000.0000 | 500.0000 |
| Capsule Size (mm) | 0.3000 | 5.0000 | 10.0000 |

EXAMPLE 15

A sugar-containing chewing gum with seamless beads contained therein having the composition shown in Table 6 can be prepared according to the method described in F. Fritz "Chewing Gum Technology, *Sugar Confectionery Manufacture*, ed. E. B. Jackson (Blackie Academic and Professional, New York, N.Y.) 1995 p. 276.

TABLE 6

| Gum Components | % By Weight |
|---|---|
| Gum Base | 20.00 |
| HFCS | 6.00 |
| Glycerine | 1.00 |
| Powdered Sugar | 69.50 |
| Peppermint Flavor | 1.00 |
| Seamless beads prepared as in Example 12 | 2.50 |
| Total | 100.00 |

EXAMPLE 16

A sugar-containing chewing gum with seamless beads contained therein having the composition shown in Table 7 can be prepared according to the method described in F. Fritz "Chewing Gum Technology, *Sugar Confection Manufacture*, ed. E. B. Jackson (Blackie Academiic and Professional, New York, N.Y.) 1995 p. 276.

TABLE 7

| Gum Components | % By Weight |
|---|---|
| Gum Base | 23.00 |
| Glycerine | 10.00 |
| lecithin | 0.50 |
| Sorbitol Powder | 46.73 |
| Mannitol Powder | 15.00 |
| Wesson Oil | 0.50 |
| Aspartame | 0.27 |
| Peppermint Flavor | 1.50 |
| Seamless beads prepared as in Example 12 | 2.50 |
| Total | 100.00 |

EXAMPLES 17–19

A flavor bead composition containing a confectionery core material can be prepared in accordance with Example 1. The composition of the flavor bead composition is shown in Table 8.

TABLE 8

| | 17–19 |
|---|---|
| Shell (20%) | |
| Isomalt | 17.9601 |
| Xylitol | 1.9957 |
| Acesulfame-K | 0.0440 |
| Ethyl Vanillin | 0.0002 |
| Core (80%) | |
| *Confectionery Filling | 80.0000 |
| Total | 100.0000 |

The confectionery to be used as the core filling is a caramel filling as shown in Table 9, a "gummi" filing as shown in Table 10 and a hydrophilic syrup filing as shown in Table 11, respectively.

TABLE 9

| Caramel Filling | % By Weight |
|---|---|
| Regular Corn Syrup 42 D.E. | 19.00 |
| Invert Syrup | 47.52 |
| Granulated Sugar | 6.34 |
| Hydrogenated Vegetable Oil | 7.92 |
| Evaporated Milk | 19.00 |
| Lecithin | 0.04 |
| Fine Salt | 0.16 |
| Sodium Bicarbonate | 0.02 |
| Flavor | As desired |

TABLE 10

| "Gummi" Filling | % By Weight |
|---|---|
| Gelatin (180 Bloom) | 11.50 |
| Sugar | 36.75 |
| Regular Corn Syrup 42 D.E. | 36.75 |
| Residual Water | 15.00 |
| Flavor/Food Acid | As desired |

TABLE 11

| Hydrophilic Syrup | % By Weight |
|---|---|
| High Fructose Corn Syrup | 76.49 |
| Sucrose | 7.00 |
| Glycerine | 16.00 |
| Coloring | 0.01 |
| Lecithin | 0.50 |
| Flavor | As desired |

The caramel filling is prepared in accordance with the process disclosed in *The Art And Science Of Candy Manufacturing*, Claude D. Barnett, Books for Industry, New York, N.Y. (1978) p. 102.

The "gummi" filling is prepared in accordance with E.T. Best, "Gums and Jellies", Sugar Confectionery Manufacture, ed. E. B. Jackson, Blackie Academic and Professional, New York, N.Y. (1995) pp. 189–217.

EXAMPLE 20

A flavor bead composition prepared in accordance with Example 13 can be used to prepare a nougat candy having the composition shown in Table 12.

TABLE 12

| Components | % By Weight |
| --- | --- |
| Sugar, Granulated | 45.00 |
| Corn Syrup | 45.00 |
| Residual Moisture | 4.00 |
| Paramount C (Fat) | 0.50 |
| Fruit Beads (Example 13) | 3.00 |
| Gelatin, 150 Bloom | 2.00 |
| Vanilla Flavor | 0.50 |
| Total | 100.00 |

The nougat composition can be prepared in accordance with the process disclosed in E. B. Jackson et al., *Sugar Confectionery And Chocolate Manufacture*, Blackie Academic and Professional, New York, N.Y. (1992) p. 317.

EXAMPLE 21

A flavor bead composition prepared in accordance with Example 13 can be used to prepare a hard boiled candy having the composition shown in Table 13.

TABLE 13

| Components | % By Weight |
| --- | --- |
| Sugar, Granulated | 47.25 |
| Corn Syrup | 47.25 |
| Residual Moisture | 2.00 |
| Peppermint/Menthol Flavor | 1.00 |
| Fruit Bead (Example 13) | 2.50 |
| Total | 100.00 |

The hard boiled candy composition can be prepared in accordance with the process disclosed in E. B. Jackson et al., *Sugar Confectionery And Chocolate Manufacture*, Blackie Academic And Professional, New York, N.Y. (1992) p. 169.

EXAMPLE 22

A flavor bead composition prepared in accordance with Example 14 can be used to prepare a pan coated flavor bead composition having the composition shown in Table 13.

TABLE 13

| Pan Coated Bead Components | % By Weight |
| --- | --- |
| Core | |
| Peppermint Bead Example 14 | 66.67 |
| Coating | |
| sucrose | 28.76 |
| gum acacia | 4.00 |
| flavor | 0.50 |
| titanium dioxide | 0.02 |
| carnauba wax | 0.05 |
| Total | 100.00 |

The hard pan coated flavor bead composition can be prepared in accordance with the process disclosed in J. Becham, "Tablets, Lozenges, and Sugar Panning", *Sugar Confectionery And Chocolate Manufacture*, ed. E. B. Jackson, Van Nostrand Reinhold, New York, N.Y. (1990) p. 251.

EXAMPLE 23

A flavor bead composition prepared in accordance with Example 14 can be used to prepare a sugarless hard pan coated flavor bead composition having the composition shown in Table 14.

TABLE 14

| Pan Coated Bead Components | % By Weight |
| --- | --- |
| Core | |
| Peppermint Bead Example 14 | 66.67 |
| Coating | |
| isomalt | 28.75 |
| gum acacia | 4.00 |
| flavor | 0.50 |
| titanium dioxide | 0.02 |
| acesulfame potassium (sweetener) | 0.01 |
| carnauba wax | 0.05 |
| Total | 100.00 |

The sugarless hard pan coated flavor bead composition can be prepared in accordance with the process disclosed in J. Beacham, "Tablets, Lozenges, and Sugar Panning", *Sugar Confectionery. And Chocolate Manufacture*, E. B. Jackson, Van Nostraud Reinhold, New York, N.Y. (1990) p. 251.

EXAMPLE 24

A flavor bead composition prepared in accordance with Example 12 can be used to prepare a pressed tablet candy having the composition shown in Table 15.

TABLE 15

| Components | % By Weight |
| --- | --- |
| Directly Compressible Sugar | 96.50 |
| Magnesium Stearate | 0.50 |
| Flavor | 0.50 |
| Flavor Beads (Example 12) | 2.50 |
| Total | 100.00 |

The pressed tablet candy composition can be prepared in accordance with the process disclosed in E. B. Jackson et al., *Sugar Confectionery And Chocolate Manufacture*, Blackie Academic and Professional, New York, N.Y. (1992) p. 289.

EXAMPLE 25

A flavor bead composition prepared in accordance with Example 12 can be used to prepare a sugarless pressed tablet candy having the composition shown in Table 16.

TABLE 16

| Components | % By Weight |
| --- | --- |
| Sorbitol Usp | 96.49 |
| Magnesium Stearate | 0.50 |
| Flavor | 0.50 |
| Aspartame | 0.01 |
| Flavor Beads (Example 12) | 2.50 |
| Total | 100.00 |

The sugarless pressed tablet candy composition can be prepared in accordance with the process disclosed in E. B. Jackson et al., *Sugar Confectionery, And Chocolate Manufacture*, Blackie Academic and Professional New York, N.Y. (1992) p. 289.

While the present invention has been described with respect to what is presently considered to be the preferred embodiments, it is to be understood that the invention is not limited to the disclosed embodiments. The present invention is intended to cover various modifications and equivalent mechanisms within the spirit and scope of the appended claims.

What is claimed is:

1. A consumable product comprising seamless capsules having an outer shell and an inner core, said outer shell comprising a carbohydrate in a glassy state said glassy state carbohydrate selected from the group consisting of sucrose, glucose, fructose, isomalt, hydrogenated starch hydrolysate, maltitol, lactitol, xylitol, sorbitol, erythritol, mannitol, and mixtures thereof.

2. The consumable product of claim 1 which is selected from the group consisting of foodstuffs, beverages, and medicament compositions, chewing gums, confectionery, and dentifrice compositions.

3. The consumable product of claim 1 wherein said inner core contains a material or a mixture of materials selected from the group consisting of flavorants, oil based materials and confectionery fillings.

4. The consumable product of claim 1 wherein the outer shell of said seamless capsule comprises 20 to 80% by weight of the total weight of said seamless capsule and the inner core of said seamless capsule comprises 80 to 20% by weight of the total weight of said seamless capsule.

5. The consumable product of claim 1 wherein the outer shell comprises a mixture of isomalt and xylitol.

6. The consumable product of claim 1 wherein the inner core contains at least one flavorant.

7. The consume product of claim 3 wherein the inner core contains an oil based material.

8. The consumable product of claim 3 wherein the inner core contains an oil based material and a flavorant.

9. The consumable product of claim 2 comprising a chewing gum composition comprising gum base, sugar, flavorant and seamless capsules having an outer shell comprising isomalt and xylitol and an inner core containing at least one of an oil based material and a flavorant.

10. The consumable product of claim 2 comprising a sugarless chewing gum composition comprising gum base, sorbitol, mannitol, a sugar substitute, a flavorant, and seamless capsules having an outer shell comprising isomalt and xylitol and an inner core containing at least one of an oil based material and a flavorant.

11. The consumable product of claim 3 wherein the inner core contains a confectionery filling selected from the group consisting of caramel filling, gummi filling and a hydrophilic syrup or mixtures thereof.

12. The consumable product of claim 11 wherein the outer shell comprises isomalt and xylitol.

13. The consumable product of claim 11 wherein the inner core comprises a caramel filling.

14. The consumable product of claim 11 wherein the inner core comprises a gummi filling.

15. The consumable product of claim 11 wherein the inner core comprises a hydrophilic syrup.

16. The consumable product of claim 2 in the form of a nougat.

17. The consumable product of claim 16 wherein the outer shell comprises isomalt and xylitol.

18. The consumable product of claim 2 in the form of a hard boiled candy.

19. The consumable product of claim 18 wherein the outershell comprises isomalt and xyhtol.

20. The consumable product of claim 2 in the form of a pan coated flavor bead composition comprsig said seaniless capsules having a coating thereon comprising sucrose, gum, wax, and a flavorant.

21. The consumable product of claim 20 wherein the outer shell comprises isomalt and xylitol.

22. The consumable product of claim 2 in the form of a pressed tablet candy.

23. The consumable product of claim 2 which is a chewing gum or is a confectionery selected from the group consisting of nougats, hard boiled candies, pan coated flavor beads and pressed tablet candies.

* * * * *